April 6, 1943.  L. A. WARNER  2,315,756
AIR SPEED AND SIMILAR INDICATOR
Filed Aug. 12, 1941  3 Sheets-Sheet 2
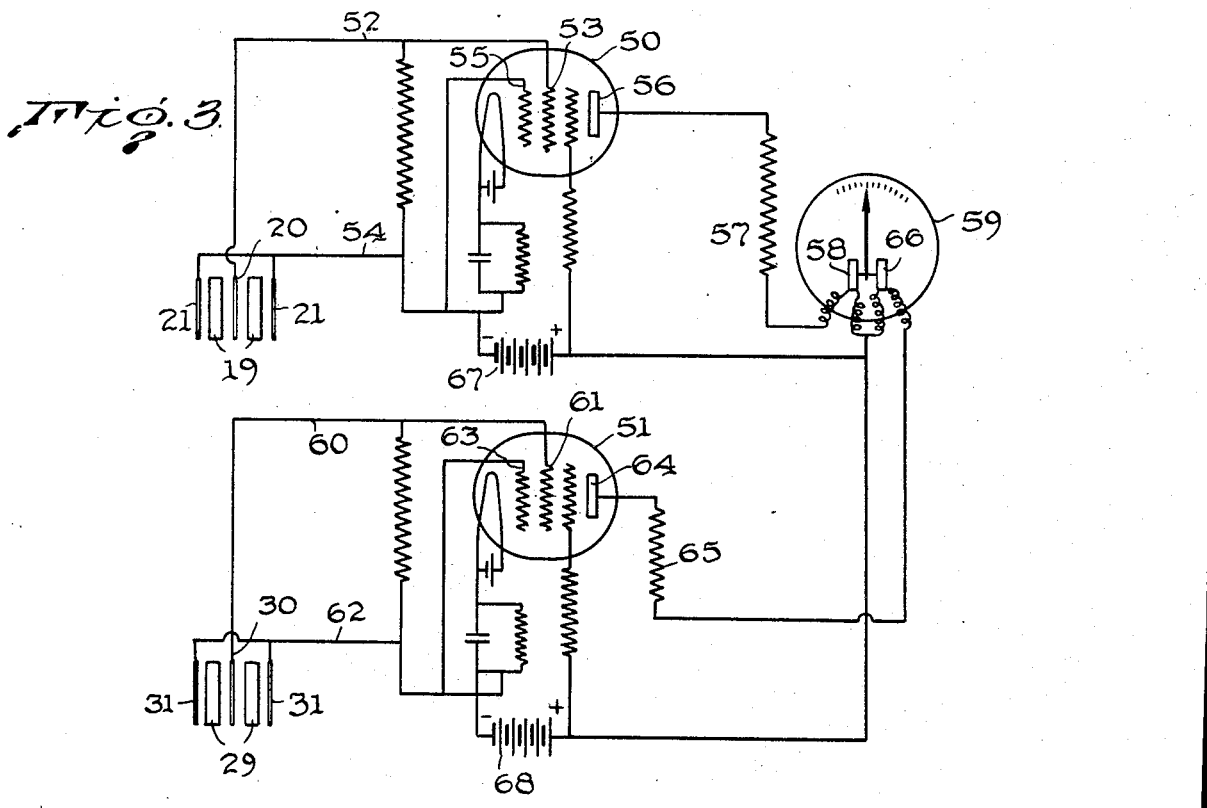
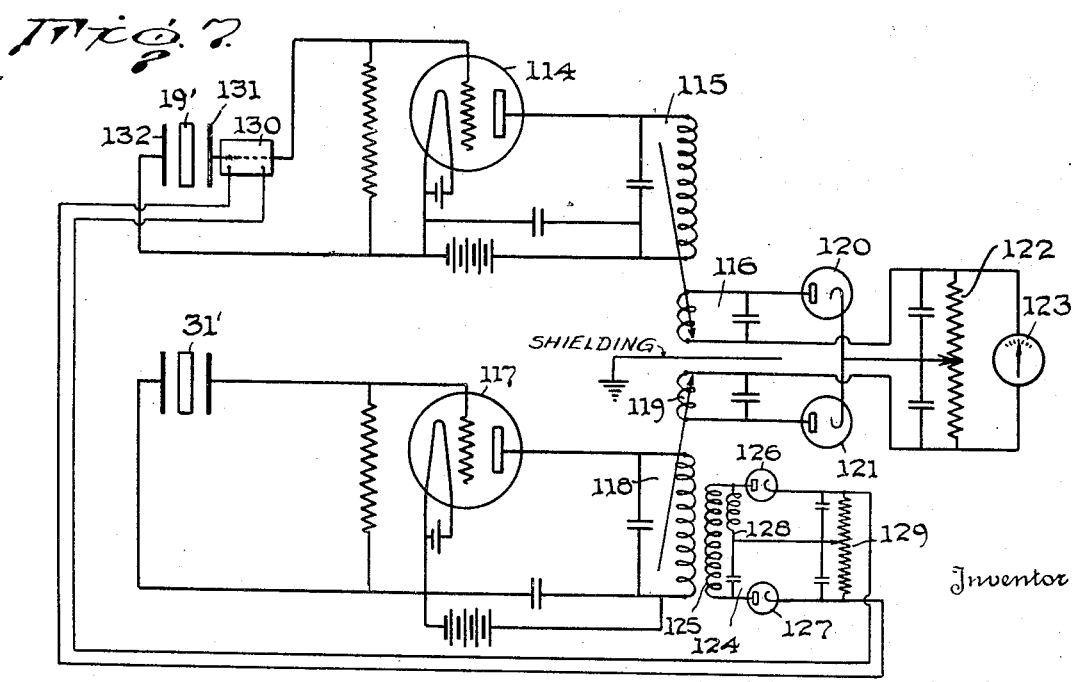
LOUIS A. WARNER,
Inventor
By Ben. J. Cheony
Attorney

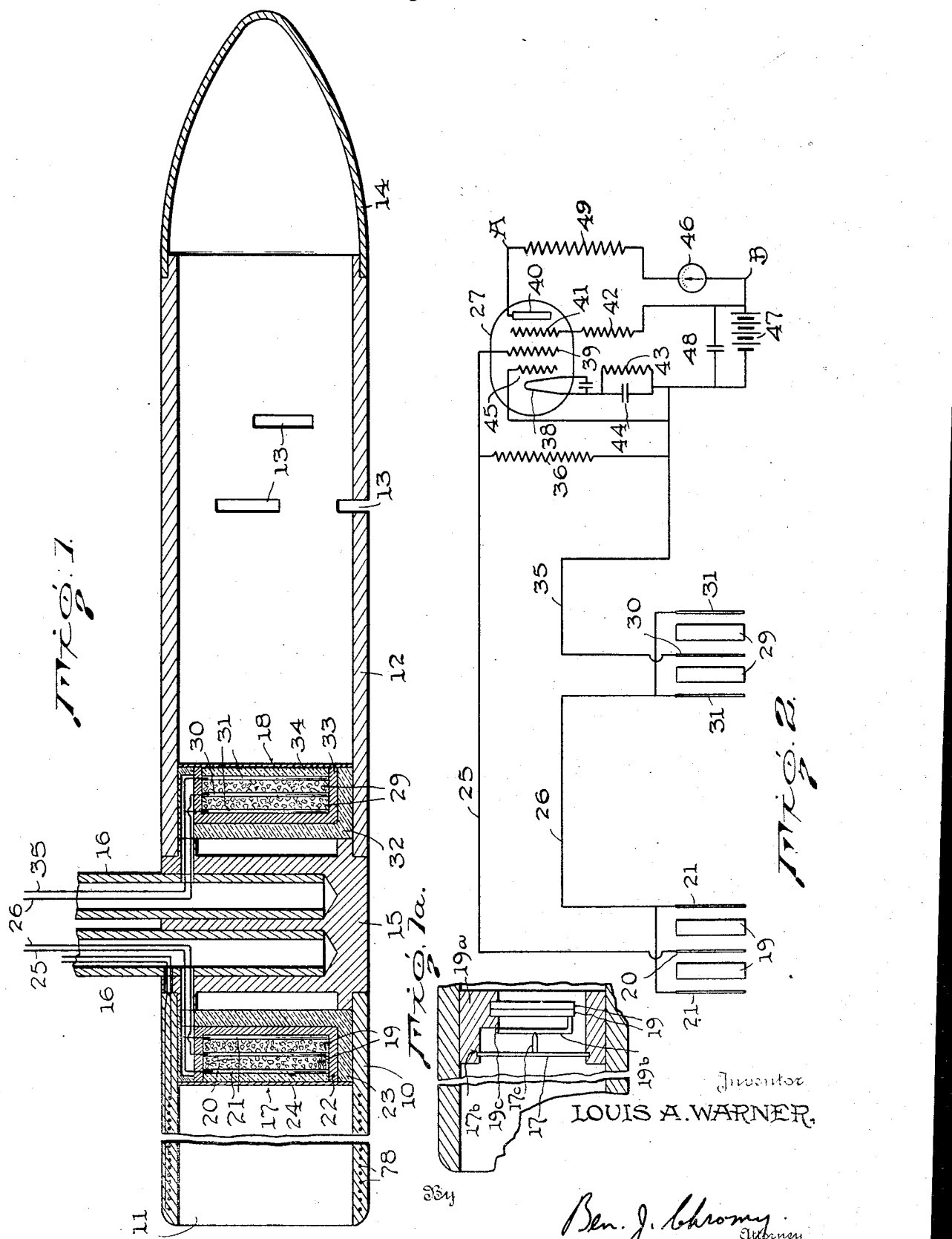

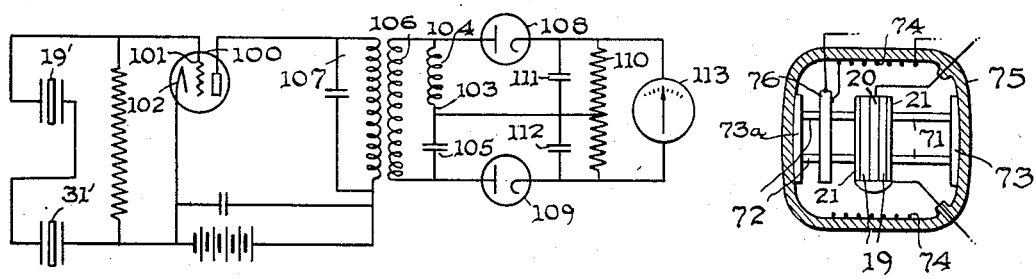
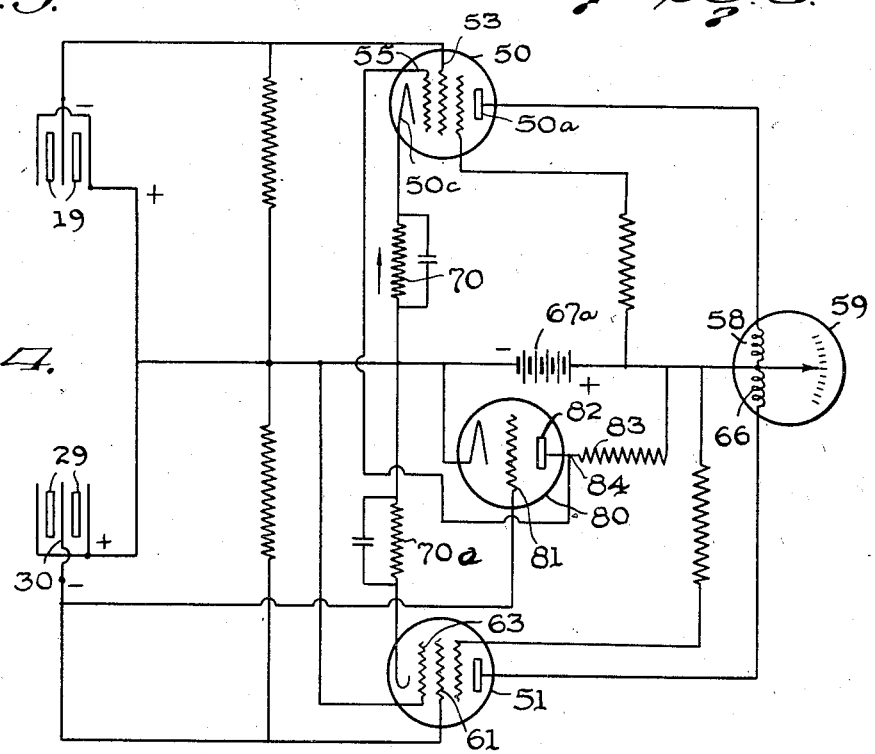
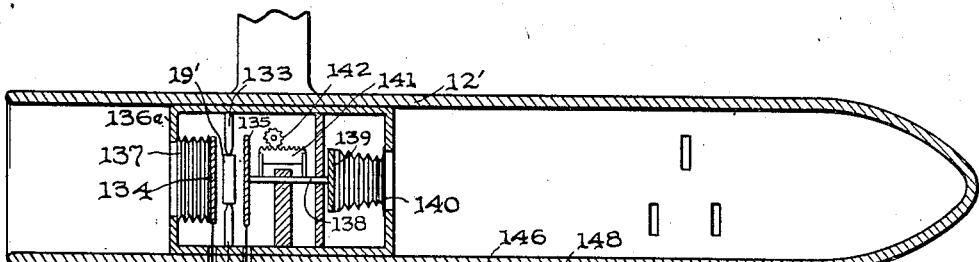
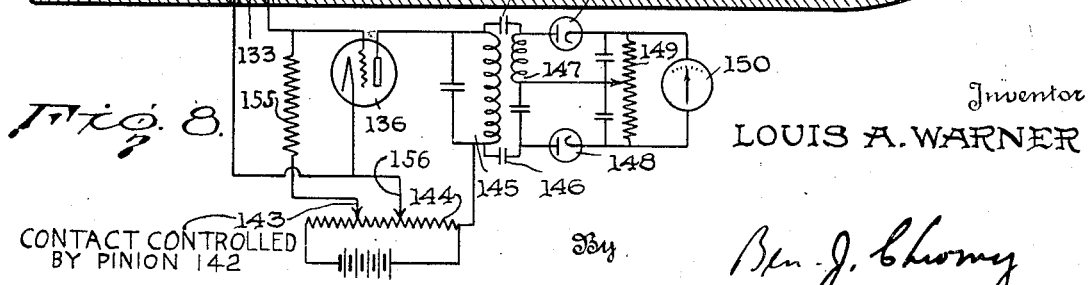

Patented Apr. 6, 1943

2,315,756

UNITED STATES PATENT OFFICE 2,315,756

AIR SPEED AND SIMILAR INDICATOR

Louis Allen Warner, Baltimore, Md.

Application August 12, 1941, Serial No. 406,569

13 Claims. (Cl. 73—212)

This invention relates to air speed indicators in general. More particularly this invention relates to indicators in which the difference or combined action of two electrical devices, at least one of which is an electrical potential producing device, is taken to produce an indication of air speed or the rate of flow.

The principal object of this invention is to provide a Pitot-static tube device employing a pair of piezo electric crystal devices, one in the Pitot tube and the other in the static tube, and connecting these to an electrical indicating device so that the difference between the pressures exerted in the Pitot tube and the static tube will be indicated.

Piezo electric crystals consisting of Rochelle salt, quartz, tourmalin and the like may be employed in accordance with this invention as will be apparent from the following description. Crystals of this character are adapted to produce electrical potentials which vary with the mechanical pressure applied thereto. These crystals, particularly those of quartz and tourmalin are also adapted to produce electrical oscillations of frequencies which may be varied by varying the pressure applied to the crystals.

In this invention I provide an arrangement in which one crystal device is positioned in the Pitot tube and another crystal device is positioned in the static tube so that electrical potentials varying with the pressures existing in these two tubes or electrical oscillations varying with said pressures may be produced. These electrical potentials or oscillations are applied to indicating circuits in which indications of air speed or flow are obtained.

Further details of this invention are set forth in the following specification, claims and the drawing, in which briefly:

Fig. 1 is a cross-sectional view of the Pitot-static tube and crystal arrangement;

Fig. 1a is a view showing another form of mounting for the crystal in the Pitot tube;

Fig. 2 is a schematic diagram of one arrangement of connections employed in accordance with this invention;

Fig. 3 is another schematic diagram of connections;

Fig. 4 illustrates a form of this invention in which compensation is made in the air speed indicator for changes in atmospheric pressure;

Fig. 5 is a modified circuit which employs oscillating crystals;

Fig. 6 is a view of piezo electric crystal elements supported in an evacuated housing;

Fig. 7 is a diagram of another arrangement of connections showing the use of a pair of oscillating crystals; and Fig. 8 illustrates a form of this invention employing only one crystal device, and bellows for positioning its electrodes.

Referring to Fig. 1 of the drawings in detail, reference numeral 10 designates the Pitot tube having open mouth 11 pointed in the direction of travel. Reference numeral 12 designates the static tube having air holes 13 toward the rear thereof and having a bullet-shaped cap 14 at the end. Both the Pitot 10 and the static tube 12 are attached to the supporting member 15 which is provided with one or more pipes 16 adapted to be attached to a strut or other member of an airplane. A piezo electric crystal device 17 is positioned in the Pitot tube and a similar piezo electric crystal device 18 is positioned in the static tube. The device 17 consists of two piezo electric crystal slabs or plates 19 and these are separated by a thin metallic electrode 20. A pair of side electrodes 21 connected together are employed. In cases where Rochelle salt crystals are employed, the crystals are assembled with the electrodes and a moisture impervious coating of lacquer, varnish or wax 22 is applied. This is then enclosed in a casing 23 which is fitted into the Pitot tube 10 and fastened therein. A metallic diaphragm 24 is attached to the mouth of the casing 23 and the variable air pressure is transmitted through this diaphragm and the moisture impervious crystal coating to the crystal. This varying pressure causes the piezo electric crystal device to produce correspondingly varying electrical potential which is applied to the connections 25 and 26.

As seen in Fig. 2, connection 25 is connected to one of the grids of the tube 27 and connection 26 is connected to the side electrodes 31 of the piezo electric crystal elements 29 positioned in the static tube 12. The polarity of the electrodes 31 is the same as that of the electrodes 21 and these piezo electric crystal devices are in this case differentially connected so that the difference of their potentials is applied to the vacuum tube 27. The crystal elements 29 are similar to the crystal elements 19 and they are also provided with a moisture impervious coating 33, a housing 32 fitted into the static tube 12, and the diaphragm 34 for transmitting variable atmospheric pressure thereto.

A winding of heating wires surrounding the Pitot tube, and supply leads therefor, for melting ice, is shown at 78.

The central electrode 20 is connected by means of the wire 25 to the grid 39 of the tube 27 and the central electrode 30 is connected by the wire 35 to the grid 45, the grid resistor 36, the cathode bias resistor 43 and the negative terminal of the source of current supply 47. It is therefore seen that the piezo electric crystal elements are differentially connected between the grid electrodes 39—45. The cathode bias resistor 43 is shunted by a by-pass condenser 44 and is connected between the cathode 38 and the negative terminal of the battery 47. The cathode 38 may be of the filament type or it may be of the indirectly heated type. An auxiliary grid 41 connected to the positive terminal of the battery 47 through the resistance 42 is also provided to the tube. Anode 40 of the tube 27 is connected to the indicating device 46 through the resistance 49. This resistance may be dispensed with if the indicating device 46 is of sufficient impedance to be itself directly connected to the anode. The positive terminal of the battery 47 is connected to the indicating device 46 and a by-pass condenser 48 is shunted across the battery 47.

In the modified arrangement shown in Fig. 3, the crystal elements 19 and 29 are connected to separate tubes 50 and 51, respectively, and in this case the central electrode 20 of the crystals 19 is connected to the grid 53 of the tube 50 by means of the wire 52. Wire 54 connects electrodes 21 to the grid 55. The anode 56 of the tube 50 is connected through the resistance 57 to the coil 58 of the differential meter 59.

Likewise the central electrode 30 of the crystals 29 is connected by wire 60 to the grid 61 of the tube 51 and the outside electrodes 31 are connected by wire 62 to the grid 63. The anode 64 of the tube 51 is connected through the resistance 65 to the other coil 66 of the differential meter 59. In this case a pair of anode batteries 67 and 68 is illustrated.

In operation the meter 46 of Fig. 2 and meter 59 of Fig. 3 produce indications which are proportional to the difference of the potentials produced by the piezo electric crystal devices 19 and 29. Consequently these meters may be calibrated in air speed units because the piezo electric crystal device 19 is responsive not only to the air impact caused by the movement of the aircraft through the air but it is also responsive to the varying static atmospheric pressure. The piezo electric crystal device 29 on the other hand is responsive only to the varying static atmospheric pressure. The pressure applied to this device would therefore decrease as the static atmospheric pressure decreased.

Where desired the piezo electric crystal elements 19 and 29 and the associated electrodes may be supported inside of evacuated containers in such a way that the atmospheric pressure is applied for the purpose of compressing the crystals only along a single directional line of application. This type of housing is shown in Fig. 6. The piezo electric elements 19 and the electrodes 20 and 21 associated therewith are supported by means of the supporting members 71 and 72 between the plates 73 and 73a. The members 71 and 72 may be in the form of coil springs which may be compressed to a slight extent. The plates 73 and 73a abut against the inside surfaces of the ends of the container 75. The pressure applied to plates 73 and 73—a is transmitted by supporting members 71 and 72 to the faces of the piezo electric elements 19, and a potential varying with the air pressure is produced. This container 75 may be in the form of a bellows if desired and the plates 73 and 73a may form the ends of this bellows. A heating winding 74 connected in series with a thermostatic device 76 and a source of current supply is provided to maintain the temperature inside of the container 75 substantially uniform. The pressure inside of the container 75 need not necessarily correspond to atmospheric pressure but may be either more or less than atmospheric pressure as desired.

In Fig. 1a I have illustrated another form of mounting for the piezo electric crystal devices 19 and 29. In this form of mounting one end of the piezo electric crystal elements 19 is substantially rigidly clamped by the member 19a which may be in the form of a ring adapted to slide into the mouth of the tube 11. This ring is also provided with a flange 17b adapted to engage the peripheral portions of the diaphragm 17 so that this diaphragm may be clamped into place thereon. The free end of the piezo electric crystal elements is coupled to one end of the arm 19b and the other end of this arm is pivoted at 19c. A connecting arm 17c is provided between the center of the diaphragm and the arm 19b. The piezo electric crystal elements 19 mounted as shown in Fig. 1a produce an electromotive force through the flexing, bending or torsion of the elements when said elements are subjected to a pressure producing flexing, bending or torsion. The electrodes 20 and 21 are also provided to these elements and these electrodes are connected as shown in Figs. 2, 3 and 4.

Referring to the automatic compensation modification of Fig. 4 in detail, the piezo electric crystal elements 19 and 29 are in this case connected to control grids of the vacuum tubes 50 and 51, respectively, and an additional control tube 80 is provided for the purpose of varying the grid bias on the grid 55 of the tube 50. The control grid 81 of the tube 80 is connected to the electrode 30 of the piezo electric crystal elements 29 and to the grid 61 of the tube 51. The anode 82 of tube 80 is connected through the resistance 83 to the positive terminal of the battery 67a and to the differential windings 58—66 of the meter 59. This anode 82 is also connected to the grid 55 of the tube 50. By means of this tube 80 and these connections the piezo-electric crystal device 29 which corresponds to the device 29 shown in Fig. 1, functions to control the grid bias on the grid 55 of the tube 50.

Therefore as the atmospheric or other pressure on the crystal elements 29 decreases, less negative potential is applied to the grid of the tube 80 causing more current to flow through this tube and this results in a greater potential drop across the resistance 83, so that more negative potential is applied to the grid 55 of the tube 50, that is, the bias on the grid 55 is increased and the current flowing through the tube 50 between the anode 50a and the cathode 50c is decreased. The purpose of varying the grid bias of the grid 55 in this way is to provide compensation for reduced air pressure with increased altitude. As was pointed out above, the current through the tube 50 is decreased when the pressure on the piezo electric crystal elements 29, which are in the static chamber 12 of the Pitot tube, is decreased. At the same time the total force of the air pressure on the crystal elements 19 which are in the open end of the Pitot tube, is also decreased because of the lower density of the air at higher altitudes. The circuit is so adjusted that the indicator 59 produces true air speed indications at all altitudes irrespective of variations in the air density. If desired the connection 84 may be made variable over the resistance 83 so that the circuit may be adjusted manually by the operator.

Referring further to Fig. 4, the cathodes of the tubes 50 and 51 are connected through suitable resistance and condenser circuits 70 and 70a to the cathode of the tube 80 and the negative terminal of the source of current supply 67a. The grid 63 of the tube 51 is also connected to the negative terminal of the battery 67a either directly or through a suitable resistance which may be variable and may be used for the purpose of adjusting the apparatus. Suitable grid leaks are also connected between the grids 53 and 61 of the tubes 50 and 51, respectively, and the cathodes thereof. The crystal elements 19 and 29 also have terminals thereof connected together and two electrodes of the same polarity of the crystal elements are connected together. In the diagram illustrated the positive electrodes of the crystal elements are connected together. This connection between the crystal elements is connected to the negative terminal of the source of current supply 67a while the other electrodes of the crystal elements are connected to the grids 53 and 61 respectively.

In Figs. 5, 7 and 8 I have illustrated a form of this invention employing oscillating piezo electric crystal devices.

Referring to the oscillator arrangement of Fig. 5 the piezo electric crystal element 19' which corresponds to the elements 19 of Fig. 1 is connected in series with the crystal element 31' between the grid 101 and the cathode 102 of the oscillator tube 100. In this circuit both of the piezo electric crystal elements are in oscillation at frequencies corresponding to the one or more of the dimensions thereof. The frequencies of the crystals 19' and 31' are preferably close to each other. However they may be the same. In practice it is preferable to employ crystals which produce a suitable beat frequency, which is the difference between their frequencies or between harmonics of their frequencies. In practice I prefer to employ beat frequencies of 100,000 or 200,000 cycles so as to simplify the construction of the series tuned circuit 103 employing the condenser 105 and the inductance 104. This series tuned circuit is connected across the inductance 106 which is coupled to the tank circuit 107 of the vacuum tube oscillator. The rectifiers 108 and 109 are connected with their anodes to the ends of the tuned circuit 103 and with their cathodes to the resistance 110. The condensers 111 and 112 are connected across the resistance 110 and the common terminal of these condensers is also connected to the tuned circuit 103. An indicator 113 is connected across the resistance 110.

Referring further to Fig. 5, when the pressure on the crystals 19' and 31', or either one of them, is varied, the frequency of oscillation thereof is also varied or changed. Consequently the beat frequency produced by mixing the frequencies of these crystals would also change. By mounting the crystals 19' and 31' in a Pitot static tube such as shown in Fig. 1 the pressure on the crystal 19', which is mounted in the open mouth of the Pitot tube, is varied in accordance with the speed of the craft, while the pressure on the crystal 31' is not varied in this manner since this crystal is mounted in the static portion of the tube. Consequently the beat frequency produced between the frequencies of these crystals is varied in accordance with the air speed of the craft. Since the tuned circuit 103 is tuned to the original beat frequency, the indicator 113 will produce indications which correspond to the departure of the beat frequency from the frequency to which the circuit 103 is tuned. The indicator 113 therefore produces indications which are proportional to the air speed of the craft. The frequency of the crystal device 19' may be made either to increase or decrease with an increase in pressure thereon. The same is true of the crystal device 31' so that the apparatus may be made to compensate for changes in atmospheric pressure with changes in altitude.

The embodiment of my invention shown in Fig. 7 also employs oscillating crystals. In this case however crystal 19' is connected to the grid and cathode of the oscillator 114 which is provided with a tank circuit 115 coupled to the indicator tuned circuit 116. The crystal 31' on the other hand is connected between the grid and cathode of the oscillator 117 employing a tuned tank circuit 118 coupled to the tuned circuit 119 of the indicator. The tuned circuits 116 and 119 are tuned to the crystals 19' in the Pitot tube and 31' in the static chamber respectively, or to harmonics or subharmonics thereof, and these tuned circuits are preferably isolated or shielded from each other so that the corresponding diode rectifiers 120 and 121 function to rectify only the potentials induced into the respective tuned circuits 116 and 119 from the respective tank circuits 115 and 118. These rectified potentials are applied across the resistance 122 differentially or in opposition. The meter 123 is connected across the resistance 122 and produces indications corresponding to the difference of the rectified potentials.

Referring further to Fig. 7, an auxiliary circuit 124 is coupled through its inductance 125 to the tuned circuit 118. This auxiliary circuit employs a series tuned circuit 128 tuned to the frequency of the circuit 118 and the potential across this series tuned circuit is rectified by means of two oppositely connected rectifiers 126 and 127. A potential corresponding to the difference between the rectified potentials is applied across the resistance 129 which is connected to the solenoid 130 associated with the crystal 19.' The purpose of this arrangement is to employ changes in frequency produced in the static crystal device 31' by changes in altitude, to vary the air gap between the crystal electrode 131 and the crystal 19'. In this way the frequency of the crystal unit 19' may be shifted in accordance with changes in altitude, that is, changes in static atmospheric pressure. This is employed to produce true air speed indications irrespective of changes in altitude or atmospheric pressure.

In Fig. 8 I have illustrated a form of this invention in which a single oscillating crystal 19' is supported on its edges by means of clamping supports 133, between two electrodes 134 and 135 which are connected to the oscillator tube 136. The crystal and its electrodes are mounted in the mouth of the Pitot tube 12' by means of the supporting structure 136a. This structure divides the Pitot tube into two parts, one of which opens to the mouth of the tube and the other of which forms the static part of the tube. The electrode 134 is supported by means of the bellows 137 which opens into the forward or mouth part of the Pitot tube and moves the electrode 134 toward or away from the corresponding face of the crystal 19' depending upon the air pressure exerted upon the electrode and the bellows 137. The other electrode 135 is also movable with respect to the crystal 19' and this electrode is slidably supported by the rod 138. the other end of said rod being attached to the plate 139 forming one end of the second bellows 140. The second bellows 140 is sealed at some definite pressure such as the pressure at sea-level and therefore expands as it is moved to higher altitudes. In this way this second bellows functions to move the electrode 135 with reference to the crystal as the apparatus is taken to higher altitudes. In the arrangement here described, the bellows moves the electrode closer to the crystal face as the apparatus is moved to higher altitudes. A rack 141 is attached to the the rod 138 for the purpose of rotating the pinion 142 in accordance with the movements of the rod 138 and this pinion is coupled to the variable contact 143 of the resistance 144 for the purpose of varying the grid bias voltage of the oscillator tube 136 with changes in altitude. This grid bias is applied through grid resistor 155. The cathode of tube 136 is connected to a second variable tap 156 on the potentiometer resistance 144. The tuned tank circuit 145 is coupled by means of small coupling condensers 146 to the series tuned circuit 147 which is tuned to the frequency of the circuit 145. A pair of diode rectifier tubes 148 are connected to the series tuned circuit 147 and to the resistance 149. An indicator 150 is connected to the resistance 149 and this indicator is energized by potential across this resistance.

This circuit of Fig. 8 depends for its operation upon the frequency which is produced in the piezo electric crystal unit 19' by varying the spacing of the electrodes with respect to the corresponding faces of the piezo electric crystal. Thus with increasing air speed the electrode 134 is brought closer to a corresponding crystal face and produces a change in the frequency of the crystal unit which change is reflected in the indicator 150. However as the aircraft reaches the higher altitudes the same speed will not produce a corresponding movement in the electrode 134 toward the crystal face because of the lower air densities at the higher altitudes. Consequently the electrode 135 is brought closer to the corresponding crystal face through the operation of the bellows 140 as the altitude is increased.

As the airspeed is changed the frequency of the crystal 19' in Fig. 8 changes and consequently the oscillations produced by the oscillator tube 136 also change in frequency. As a result potential differences corresponding to the changes in air speed are developed across the inductance and the capacity of the tuned circuit 147, individually. The indicating device 150 which may be in the form of a d'Arsonval meter, responds to the differences of the potentials rectified by the rectifiers 148 and therefore indicates the departure of the oscillator frequency from the initial frequency.

The apparatus shown in Fig. 8 may be considered as a simplified form of the apparatus shown in Fig. 7. In Fig. 7 the static crystal 31' is employed to bring the electrode 131 of the crystal 19' closer to the corresponding crystal face as the altitude increases. The forward electrode 132 shown in Fig. 7 may be mounted in the same manner as the forward electrode 134 shown in Fig. 8. The indicators 113 and 123 shown in Figs. 5 and 7 may be the same type of indicators as 150 shown in Fig. 8.

Furthermore the bellows 137 and 140 (Fig. 8) are preferably made of temperature compensated material so that variations in temperature do not affect these bellows.

Various modified forms of this invention may be made without departing from the spirit and scope of this invention and therefore I do not desire to limit this invention to the exact details described and illustrated except insofar as those details may be defined by the claims.

What I claim is:

1. A Pitot-static tube unit, comprising: a pair of hollow elements, one of said hollow elements being open for receiving the impact of air, and the other of said hollow elements having openings adapted to permit atmospheric pressure to exist therein, piezo electric crystal elements in each of said hollow elements respectively, pressure responsive means in each of said hollow elements connected to said crystal elements respectively for transmitting pressure thereto, and an electrical circuit for said piezo electric crystal elements connected for indicating the difference in air pressures on said piezo electric crystal elements.

2. An air speed indicator, comprising: a piezo electric crystal element, means for impressing the impact of air on said piezo electric crystal element whereby said element produces an electric potential varying with the force of the impact of air, correction means responsive to atmospheric air pressure and comprising electronic tube means for controlling the effect of the electrical output produced by said piezo electric crystal element in accordance with variations in the atmospheric air pressure, and electrical indicating means connected to said element and said correction means for producing air speed indications controlled by the said piezo electric crystal element and said correction means.

3. An air speed indicator, comprising: a piezo electric crystal element, means for impressing the impact of air on said piezo electric crystal element whereby said element produces an electric potential varying with the force of the impact of air, an amplifier connected to said piezo electric crystal element, means responsive to atmospheric air pressure for varying a bias voltage of said amplifier in accordance with variations in the atmospheric air pressure, and electrical indicating means connected to the output of said amplifier for producing air speed indications controlled by the said piezo electric crystal element and said second means.

4. A Pitot-static tube unit, comprising: a pair of hollow elements, one of said hollow elements being open for receiving the impact of air, and the other of said hollow elements being open to permit atmospheric pressure to exist therein, piezo electric crystal elements in each of said hollow elements respectively, pressure responsive means in each of said hollow elements connected to said crystal elements respectively for transmitting pressure thereto, an oscillating electric circuit for said piezo electric crystal elements, and means connected to said circuit for indicating the difference in air pressures on said piezo electric crystal elements.

5. An air speed indicator, comprising: means comprising a first hollow element responsive to the impact of air for varying a voltage in accordance with variations in the force of impact of the air, a piezo electric crystal adapted under applied pressure to generate an electrical voltage, means comprising a second hollow element for transmitting static atmospheric air pressure to said piezo electric crystal, and means connected to said first means and to said piezoelectric crystal for producing air speed indications controlled by said first means and said piezo electric crystal.

6. An indicating device for indicating flow of or speed through a variable density medium, comprising: a piezo electric crystal adapted under applied pressure to produce an electrical output having a frequency characteristic thereof variable in accordance with the flow of or speed through a variable pressure medium, means responsive to the dynamic pressure of said flowing medium and adapted to apply said pressure to said crystal, and correction means comprising electronic tube means for changing said piezo electric crystal output frequency characteristic in accordance with the static pressure of said medium.

7. An indicating device for indicating flow of or speed through a variable density medium, comprising: a pair of piezo electric crystals, one of said crystals being exposed to air pressure produced by the impact of moving air and the other being exposed to static atmosphere, a pair of amplifier tubes having the cathodes thereof connected together, an indicator having differential windings connected to the respective anodes of said tubes, said piezo electric crystals being connected to grids of said tubes, and an auxiliary tube having its output connected for controlling the grid bias of the one of said amplifier tubes which is connected to said crystal exposed to air impact, the other of said piezo electric crystals being connected to the grid of said auxiliary tube, whereby said crystal exposed to static atmosphere controls the grid bias of said amplifier tube which is connected to said crystal exposed to air impact in accordance with changes in density of the medium.

8. A Pitot-static tube unit, comprising: a pair of hollow elements, one of said hollow elements being open for receiving the impact of air, and the other of said hollow elements having openings adapted to permit atmospheric pressure to exist therein, piezo electric crystal elements in each of said hollow elements respectively, means in each of said hollow elements for applying to the crystal element therein the pressure existing in said hollow element respectively, electronic tube means comprising a plurality of control grids respectively connected to said crystal elements, and an electrical indicating instrument connected to the output of said tube means.

9. A Pitot-static tube unit, comprising: a pair of hollow elements, one of said hollow elements being open for receiving the impact of air, and the other of said hollow elements having openings adapted to permit atmospheric pressure to exist therein, piezo electric crystal elements in each of said hollow elements respectively, means in each of said hollow elements for applying to the crystal element therein the pressure existing in said hollow element respectively, an electrical circuit system comprising electron tubes and an oscillating circuit and being connected to said crystal elements, and an electrical indicating instrument connected to said circuit system.

10. In a compensated Pitot-static tube unit, a first receptacle adapted to maintain therewithin the static pressure of the ambient air, a second receptacle open at one end for receiving the impact of impinging air, a first and a second piezo electric crystal element respectively mounted in said receptacles, oscillating circuits respectively connected to said crystal elements, tuned output circuits respectively connected to said oscillating circuits and being respectively tuned to the frequencies of said crystal elements, individual means for rectifying the outputs of said tuned circuits, and means for measuring the difference between said rectified outputs.

11. In a compensated Pitot-static tube unit, a first receptacle adapted to maintain therewithin the static pressure of the ambient air, a second receptacle open at one end for receiving the impact of impinging air, a first and a second piezo electric crystal element respectively mounted in said receptacles, oscillating circuits respectively connected to said crystal elements, tuned output circuits respectively connected to said oscillating circuits and being respectively tuned to the frequencies of said crystal elements, individual means for rectifying the outputs of said tuned circuits, means for measuring the difference between said rectified outputs, electrodes for said crystal elements, an auxiliary tuned circuit coupled to the oscillating circuit of the crystal in the static pressure receptacle, means for rectifying the output of said auxiliary circuit, and electro-mechanical means adapted under applied voltage to vary the spacing between a said electrode and a said crystal in said second receptacle and being connected to said last named rectifying means of said auxiliary circuit.

12. In a compensated Pitot-static tube unit, a first receptacle adapted to maintain therewithin the static pressure of the ambient air, a second receptacle open at one end for receiving the impact of impinging air, a common chamber attached to both of said receptacles, a piezo-electric crystal in said chamber, electrodes for said crystal, individual means for displaceably mounting said electrodes respectively for varying the spacing of said electrodes from said crystal, a pair of pneumo-mechanical means respectively mounted in said receptacles and being responsive to the pressures respectively applied in said receptacles and adapted to cause linear displacement under differences in applied pressure and being respectively connected to said electrodes, and electrical means connected to said crystal and adapted to measure the frequency of the output voltage thereof.

13. In a compensated Pitot-static tube unit, a first receptacle adapted to maintain therewithin the static pressure of the ambient air, a second receptacle open at one end for receiving the impact of impinging air, a common chamber attached to both of said receptacles, a piezo electric crystal in said chamber, electrodes for said crystal, individual means for displaceably mounting said electrodes respectively for varying the spacing of said electrodes from said crystal, a pair of pneumo-mechanical means respectively mounted in said receptacles and being responsive to the pressures respectively applied in said receptacles and adapted to cause linear displacement under differences in applied pressure and being respectively connected to said electrodes, an electron tube having its input connected to said crystal, electrical circuits including an electrical measuring instrument connected to the output of said tube, mechanically adjustable means for adjusting the grid bias of a grid of said tube, and means actuatable by displacement of the pneumo-mechanical means mounted in said static pressure receptacle and adapted to adjust said grid bias adjusting means.

LOUIS ALLEN WARNER.